(12) United States Patent
Graeffe et al.

(10) Patent No.: US 8,117,891 B2
(45) Date of Patent: Feb. 21, 2012

(54) METHOD FOR CALIBRATION OF MEASURING EQUIPMENT AND MEASURING EQUIPMENT

(75) Inventors: Jussi Graeffe, Kyröskoski (FI); Markku Mäntylä, Kangasala (FI); Tomi Tynkkynen, Tampere (FI)

(73) Assignee: Metso Automation Oy, Helsinki (FI)

( * ) Notice: Subject to any disclaimer, the term of this patent is extended or adjusted under 35 U.S.C. 154(b) by 782 days.

(21) Appl. No.: 12/282,316

(22) PCT Filed: Mar. 7, 2007

(86) PCT No.: PCT/FI2007/050124
§ 371 (c)(1),
(2), (4) Date: Sep. 22, 2008

(87) PCT Pub. No.: WO2007/104833
PCT Pub. Date: Sep. 20, 2007

(65) Prior Publication Data
US 2009/0056412 A1    Mar. 5, 2009

(30) Foreign Application Priority Data

Mar. 10, 2006    (FI) ..................................... 20065160

(51) Int. Cl.
*G01B 3/30* (2006.01)
(52) U.S. Cl. ....................................................... 73/1.81

(58) Field of Classification Search .................. None
See application file for complete search history.

(56) References Cited

U.S. PATENT DOCUMENTS

| | | |
|---|---|---|
| 5,062,298 A | 11/1991 | Falcoff et al. |
| 5,355,083 A | 10/1994 | George et al. |
| 5,485,082 A | 1/1996 | Wisspeintner et al. |
| 6,281,679 B1 | 8/2001 | King et al. |
| 6,967,726 B2 | 11/2005 | King et al. |
| 2003/0024301 A1 | 2/2003 | Graeffe et al. |
| 2005/0073694 A1 | 4/2005 | King et al. |

FOREIGN PATENT DOCUMENTS

| | | |
|---|---|---|
| FI | 114337 B | 9/2004 |
| JP | A-60-114709 | 6/1985 |
| JP | A-01-155204 | 6/1989 |
| JP | A-01-156615 | 6/1989 |

*Primary Examiner* — Robert R Raevis
(74) *Attorney, Agent, or Firm* — Oliff & Berridge, PLC

(57) ABSTRACT

A method for the calibration of measuring equipment, and measuring equipment. The measuring equipment comprises at least one first sensor, at least one second sensor and at least one reference piece. When the measuring equipment is calibrated, a moving web is supported against the reference piece and the reference piece with the moving web supported thereto is moved to different distances from the first sensor and the second sensor. Further, a distance between the first sensor and the moving web and a distance between the second sensor and the reference piece is measured at least for two different distances, and the first sensor and the second sensor are calibrated to be uniform in relation to the movement of the reference piece.

27 Claims, 2 Drawing Sheets

METHOD FOR CALIBRATION OF MEASURING EQUIPMENT AND MEASURING EQUIPMENT

BACKGROUND OF THE INVENTION

The invention relates to a method for the calibration of measuring equipment measuring the thickness of a moving web, the measuring equipment comprising at least one first sensor, at least one second sensor and at least one reference piece.

The invention further relates to measuring equipment for measuring the thickness of a moving web, the measuring equipment comprising at least one first sensor, at least one second sensor and at least one reference piece.

Current measuring equipment for measuring a thickness of a moving web, such as a paper web, most typically consists of contacting, semi-contacting or non-contacting measuring equipment. In contacting measuring equipment there are measuring members that sweep both surfaces of the moving web. The thickness of the web to be measured is obtained by measuring the distance between the measuring members by means of electromagnetic sensors, for example. When semi-contacting measuring equipment is used, the surface of the moving web is supported to a reference piece for the duration of the measurement, the distance of the reference piece from a typically optical sensor located on the other side of the web being then measured by means of an electromagnetic sensor, for example. The thickness of the web to be measured is obtained by using the optical sensor to measure its distance from the surface of the paper and by deducting this from the distance to the reference piece obtained with the electromagnetic sensor. When non-contacting measuring equipment is used, the web is not separately supported for the duration of the measurement. The thickness of the web to be measured is obtained by measuring the distances of optical sensors arranged on both sides of the web from the paper and by deducting these distances from the distance between the optical sensors measured with a third, for example electromagnetic, sensor.

A typical problem with the above measuring equipment, as well as with other similar measuring equipment in which the distance of the object to be measured from the sensors or the distance between the sensors may for some reason vary, or in which the distance of the object to be measured from the sensors is great or the measurement range is large in relation to the required measurement accuracy, is that each sensor has a different response and that the responses may change over time due to drifting of the sensors. Moreover, electronic measuring equipment is sensitive to changes in the environment and for example all factors caused by temperature and having an effect on the result and mutual positioning of the sensitive sensors could not be totally eliminated even if it were possible to stabilize the temperature around the sensors. A temperature change in fact easily causes changes particularly in the response gains of sensors and not only in their offset, the error thus being dependent on the measurement distance. This means that the measuring equipment error cannot be eliminated by correcting only the offset of the sensors but also their responses must be mutually adjusted at least at two locations in the measurement range.

US 2005/0073694 A1 discloses an example of non-contacting measuring equipment for measuring the thickness of a moving web, such as a paper web, and a calibration arrangement for the measuring equipment. For the calibration the measuring equipment is provided with a movable calibration platform. The calibration of the sensors of the measuring equipment is started by moving the measuring equipment first aside from the paper web or other similar object to be measured. Next, the actual calibration of the measuring equipment is started. To calibrate the measuring equipment, the calibration platform and a calibration sample placed onto the calibration platform are moved within the measurement range of the measuring equipment to different distances from the sensors. According to an embodiment of the solution, the measuring equipment is further provided with a specific calibration measurement device used with the view of separately measuring very accurately the real movement of the calibration surface. During the calibration the calibration surface and the reference sample placed on top of it are thus moved to different distances from the sensors. Next, the distance of the sensors on opposite sides of the calibration sample from the opposite surfaces of the calibration sample and the distance between the sensors concerned are measured. In addition, the calibration measurement device measures separately the movement of the calibration platform. On the basis of the measurements the sensors of the measuring equipment are calibrated in relation to each other. After the calibration the calibration surface is lowered and the calibration sample is moved aside for the duration of the normal measuring operation of the measuring equipment.

The disclosed solution therefore allows sensors to be calibrated with respect to each other in such a way that a change in the distance between the object to be measured and the sensors or a change in the distance between the sensors does not change substantially the measurement result provided by the measuring equipment, if the characteristics of the object to be measured remain constant. With the disclosed solution it is not, however, possible to take into account the impact of the actual measurement conditions on the operation of the measuring equipment and its sensors and on changes taking place in them.

SUMMARY OF THE INVENTION

It is an object of the invention to provide a novel solution for the calibration of measuring equipment.

The method of the invention is characterized by supporting the moving web to the reference piece; moving the reference piece and the moving web supported thereto to different distances from the first sensor and the second sensor; measuring a distance between the moving web and the first sensor by means of the first sensor for at least two different distances; measuring a distance between the reference piece and the second sensor by means of the second sensor for at least two different distances; and calibrating the first sensor and the second sensor to be uniform with respect to the movement of the reference piece.

The measuring equipment of the invention is characterized in that the moving web is configured to be supported to said reference piece, the reference piece is arranged to be moved to different distances from the first sensor and the second sensor, the first sensor is configured to measure the distance between the moving web and the first sensor at least for two different distances, the second sensor is configured to measure the distance between the reference piece and the second sensor for at least two different distances and that measuring equipment further comprises a data processing unit configured to calibrate the first sensor and the second sensor to be uniform with respect to the movement of the reference piece.

For calibrating measuring equipment used for measuring the thickness of a moving web, the moving web is supported to the reference piece and the reference piece with the moving web supported thereto is moved to different distances from the first sensor. The first sensor measures the distance between the moving web and the first sensor, the second sensor measures the distance between the reference piece and the second sensor, the first sensor and the second sensor being calibrated to be uniform with respect to the movement of the reference piece.

Since the calibration is carried out in relation to the web being manufactured, the ambient conditions of the calibration situation correspond to a normal measuring event. This means that errors due to temperature, for instance, do not occur during calibration, as would be the case if the calibration were carried out aside from the web where the temperature, in a paper machine, for example, may be 50° C. lower. Moreover, since the measuring equipment does not need to be driven to the side of the web for calibration, as in prior art solutions, the calibration also takes less time. In addition to external factors, calibration of measuring equipment carried out using a moving web enables to take into account all parameters related to the object to be measured that have an impact also during the measurement event. The thickness profile of the web to be measured may thus be determined with extreme accuracy without any special arrangements, such as additional precision sensors.

BRIEF DESCRIPTION OF THE FIGURES

In the following some embodiments of the invention will be disclosed in greater detail with reference to the accompanying drawings, in which.

For the sake of clarity, some embodiments shown in the Figures have been simplified. Like parts are indicated with like reference numerals.

DETAILED DISCLOSURE OF SOME EMBODIMENTS OF THE INVENTION

Figure 1:
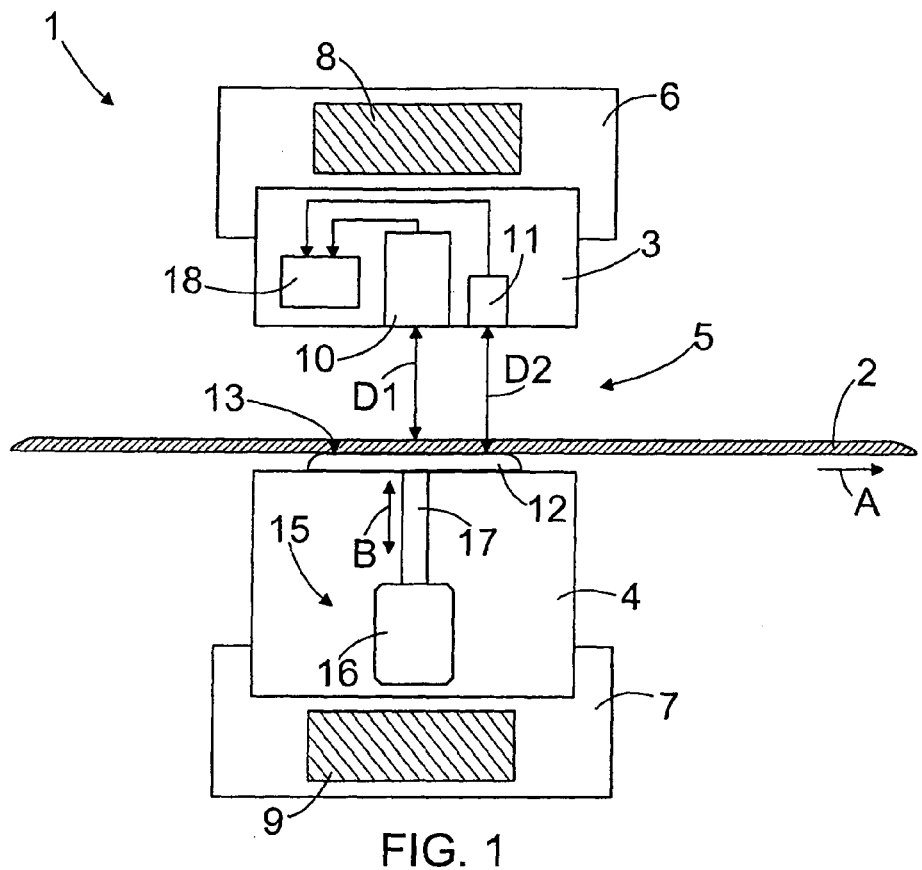
FIG. 1 is a schematic, partly sectional side view of semi-contacting measuring equipment.
Figure 2:
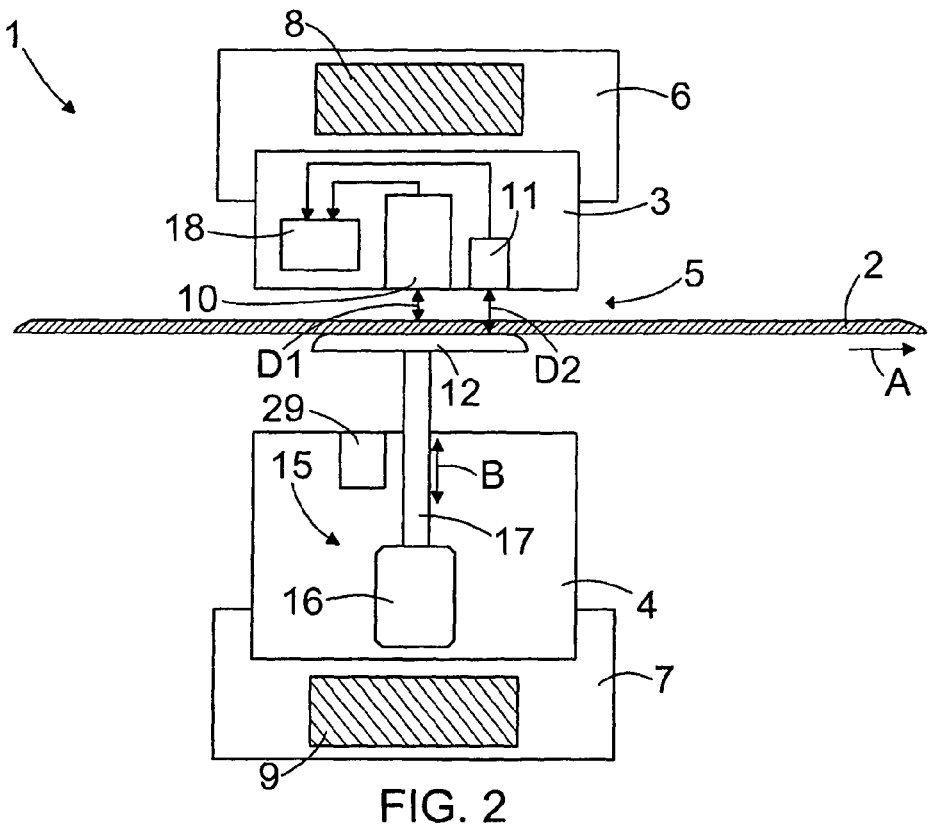
FIG. 2 is a schematic view of the measuring equipment of FIG. 1 during a step of the calibration of the measuring equipment.

FIG. 1 is a schematic sectional side view of semi-contacting measuring equipment 1 configured to measure the thickness of a paper web 2, or another similar web, such as a board web, tissue web or pulp web, moving in the direction of arrow A. For the sake of clarity, the paper web 2 in FIG. 1 is substantially thicker in proportion to the measuring equipment 1 than in reality. The measuring equipment 1 has a first measuring head 3 and a second measuring head 4 and between them an air gap 5 where the paper web 2 moves at a high speed. The first measuring head 3 is typically arranged into a first measuring carriage 6 and the second measuring head 4 into a second measuring carriage 7. The first measuring carriage 6 is arranged to move along an upper rail 8 of the measuring frame and the second measuring carriage 7 along a lower rail 9 of the measuring frame 7. The measuring carriages 6 and 7 are arranged to move back and forth in the measuring frame in a manner known per se to a skilled person, i.e. so that they traverse the entire width of the paper web 2 to be manufactured, whereby the measuring equipment 1 measures the thickness of the paper web 2 substantially continuously. FIGS. 1 and 2 thus show the measuring carriages 6 and 7 so that their direction of movement would be perpendicular to the surface of the drawing page. Naturally the first measuring head 3 and the second measuring head 4 can also be fixedly arranged to the paper machine or similar equipment, in which case the thickness of the paper web 2 is measured only at one point in the width direction of the paper web 2.

Figure 3:
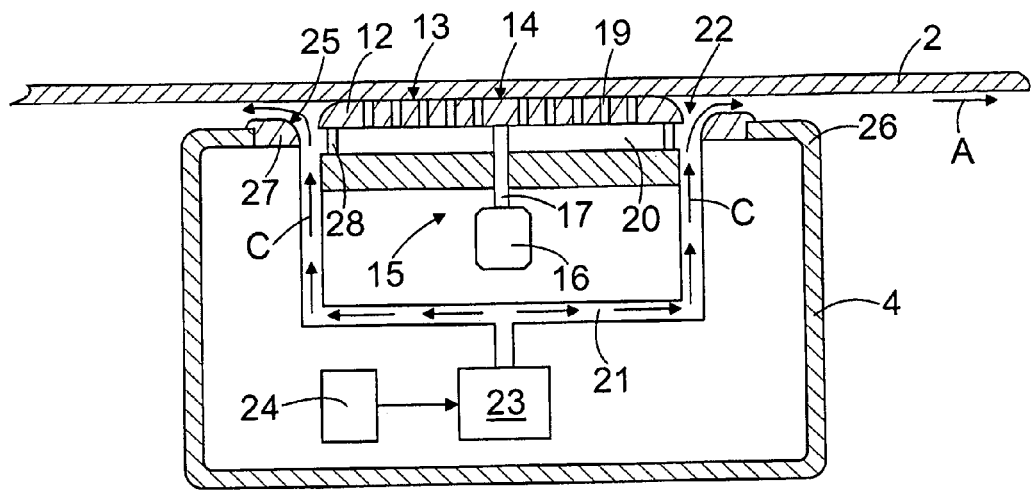
FIG. 3 is a schematic, partly sectional side view of another semi-contacting measuring equipment.

To measure the thickness of the paper web 2 the first measuring head 3 is provided with a first sensor 10 that may be a laser triangulation sensor, for example, or another optical measuring device configured to measure a distance D1 between the first sensor 10 and the surface of the paper web 2 in the direction of the first sensor 10. The first measuring head 3 is further provided with a second sensor 11 configured to measure a distance D2 between the second sensor 11 and a reference piece 12 arranged to the second measuring head 4. In semi-contacting measuring equipment used for measuring the thickness of the paper web 2, the moving paper web 2 is supported against a reference piece. The upper surface of the reference piece 12 shown in FIGS. 1 to 4 thus forms a reference surface 13 for the measurement. The reference piece 12 is preferably plate-like as shown in FIGS. 1 to 3, but obviously the outer appearance of the reference piece 12 may vary. The reference piece 12 is preferably manufactured of a material having suitable electric properties, such as steel or copper, in which case the second sensor 11 may be a coil, for example, whereby it is capable of determining the distance D2 to the reference surface 13 of the reference piece 12 in an inductive manner known per se to a person skilled in the art. This distance may also be determined capacitively, or in some other way suitable for a measurement made through the web. In that case the thickness T of the paper web 2 is obtained by deducting the distance D1 from the distance D2. For a skilled person it is naturally self-evident that the sensors do not need to be at an equal distance in the direction of measurement of the distance and that in such case the distance between the sensors is to be taken into account in the calculation of the thickness T of the web. Similarly, if for example the distance from the sensors 10 and 11 to the lower edge of the measuring head 3 is known, the distances D1 and D2 may refer to the distance of the measuring head 3 from the surface of the web 2 to be measured and from the reference piece 12. Likewise, the distance D2 does not need to express directly the distance from the reference surface 13 of the reference piece 12, but it may also indicate some other measure, provided that it can be used with sufficient precision for determining the thickness of the web.

As already stated above, a typical problem with measuring equipment in which the distance of the object to be measured from the sensors is great, or the size of the measurement range is large compared with the required measurement precision, a typical problem is that even a small difference in the sensor responses easily causes a major error in the result. It is also possible that the responses change over time due to drifting of the sensors or changes in temperature, for example. In the measuring equipment of FIGS. 1 and 2 the distance of the sensors 10 and 11 from the paper web 2 and the reference surface 13 of the reference piece 12 may vary because of bending of the upper rail 8 of the measurement frame, for example. When the paper machine is in operation, the upper rail 8 of a 10 metres wide measurement frame, for example, may bend even for 500 microns in the middle of the beam is, which is a considerably high figure, considering that the required measurement precision may be ±0.5 µm even, depending on the paper grade to be manufactured. Due to this bending the distance of the sensors 10 and 11 from the paper web 2 and the reference piece 12 changes, which causes error in the measurement result, if the responses of the sensors 10 and 11 are different. Moreover, high temperatures and variations in humidity prevailing in the vicinity of the paper machine affect the functioning of the sensors, causing drifting of the sensors in the course of time and thereby changing the measurement results produced by the sensors. To avoid these problems, the measuring equipment 1, i.e. in practice its sensors 10 and 11, must be calibrated from time to time.

The calibration must be carried out in such a way that non-linearities are also removed from each sensor at the same time. This may be carried out with an extremely precise separate sensor used for calibrating all other sensors so that they are uniform. In this method the linearity of the separate sensor and the reproducibility of the sensors determine the precision of the calibration and that of the measurement.

If the equipment does not contain a separate sensor for removing the non-linearity, but the calibration is carried out directly with one of the sensors functioning as a primary sensor and used for teaching the other sensor, the measurement will contain error due to the non-linearity of the primary sensor when the points of operation of the sensors in relation to each other change between the sensors. This happens for example when the sensors are first calibrated with each other, without the paper, and then the paper is brought between them. This changes the point of operation of one of the sensors in relation to the other. Due to the non-linearity of the primary sensor the error may be relatively big, because the non-linearity of the sensors may be 0.1-0.2% of the measurement range, and the required measurement range may be large.

An error caused by non-linearity may be removed from the profile measurement by performing the calibration on the web, whereby the point of operation does not change between the calibration and the measurement. Hence the non-linearity appears only in the measurement of the absolute thickness, where a small error is usually more easily acceptable. The error becomes smaller because the measuring carriages do not traverse when absolute thickness is being measured.

FIG. 2 is a schematic view of the measuring equipment 1 of FIG. 1 during a step in the calibration of the measuring equipment 1. For calibrating the sensors 10 and 11 of the measuring equipment 1 the second head 4 of the measuring equipment 1 is provided with a reference piece shifter 15, which in the examples of FIGS. 1 to 3 include a step motor 16 as an actuator and a shaft 17 coupled between the step motor 16 and the reference piece 12. With the step motor 16 the shaft 17 can be moved linearly, for example, thus allowing the distance of the reference piece 12 from the first sensor 10 and the second sensor 11 to be changed. Naturally the step motor 16 may be replaced by any other actuator device suitable for the purpose.

When the measuring equipment 1 is being calibrated the reference piece 12 is moved by means of the shaft 17 and the step motor 16 in the direction of arrow B to different distances from the sensors 10 and 11, thereby changing the distance of the reference piece 12 and the paper web 2 supported thereto and moving in the direction of arrow A from the sensors 10 and 11. The reference piece 12 and the moving web 2 supported thereto are moved for a small distance at a time, for example 20 microns, in relation to the sensors 10 and 11. The reference piece 12 and the web 2 supported thereto are moved to a new position in relation to the sensors 10 and 11 for as many times as is required for covering the entire area of measurement of the measuring equipment at a desired number of calibration points. The values of the sensors 10 and 11 are read at each calibration point and then the sensors 10 and 11 are calibrated in relation to each other such that the responses of both sensors are the same within the entire measurement range of the measuring equipment 1, which may typically vary ±300 microns, for example, from the normal measurement distance. In other words, the sensors 10 and 11 are calibrated to be uniform in relation to the movement of the reference piece 12.

The calibration of the first sensor 10 and the second sensor 11 in relation to each other may be carried out at a data processing unit 18 arranged at the first head 3 of the measuring equipment 1, for example, where the measurement results D1 and D2 of the sensors 10 and 11 are conveyed, the data processing unit 18 comprising the necessary calculation and memory units and software for calibrating the sensors 10 and 11 in relation to each other. The calibration may be carried out in a manner known per se to a skilled person, such as by interpolation or by forming a polynomial function from the calibration points. Thus a typical way of performing the calibration is to use a laser triangulation measurement sensor 10 offering a better linearity as the primary sensor, which is then used to teach the second sensor 11 to show the same value or the same movement as the primary sensor within a desired measurement range. After the calibration the reference piece 12 is returned to the normal operational height for the duration of the normal measuring operation of the measuring equipment 1.

Hence the sensors of the measuring equipment 1 are calibrated using the paper web 2 to be manufactured, i.e. a moving web. Calibration performed in relation to the web 2 to be manufactured enables to take into account not only external factors but also all parameters associated with the object to be measured and having an impact also during the measurement event. This means that after the calibration there will be no error caused by phase shift in the measurement result as for example in calibration only carried out in relation to the reference piece 12, without the paper web 2 between the sensors 10 and 11 and the reference piece 12, or by using a separate calibration sample (not shown in the Figure), whose characteristics differ from those of the web to be measured. In other words, when the sensors are calibrated using the moving paper web 2, the problem related to the sensors and arising from their non-linearity is removed, and hence it is possible to carry out the measurement within the limits of reproducibility of the sensors (0.1-0.4 per mille). Compared with the prior art, this improves the precision of profile measurement.

Since the calibration is carried out in relation to the paper web 2 to be manufactured, the ambient conditions, such as temperature and humidity, of the calibration situation correspond at the same time to a normal measurement situation, which is not the case when the calibration is carried out aside from the track.

Further, since the calibration is carried out in relation to the paper web 2 to be manufactured, the time needed for the calibration can be reduced because the measuring equipment does not need to be driven to the side of the paper web for calibration, nor are separate calibration samples needed. This is most important because to obtain precise measurement results, typically calibration in factory conditions must be carried out as often as once an hour even. Under certain conditions calibration may be possible even during a normal measurement operation.

A particular result of the calibration according to this disclosure is that it allows the profile of the web 2 to be measured with extreme precision, because error caused by different non-linearities of the sensors cannot be formed into the profile measurement. Thus the non-linearity of the sensors does not restrict the measurement precision, but a restricting element may arise from their reproducibility, but since that is much better the shape of the profiles can be measured with extreme precision even with sensors of an average performance. Another reason why this is significant is that in thickness measurement the precision of profile measurement is usually a much more important variable than the measurement of absolute thickness and the requirements set for the accuracy of profile measurement are stricter than those for absolute thickness.

It is advantageous for the calibration if the object to be measured is of a uniform thickness during the entire calibration. In paper machines this is usually achieved well enough when the calibration is carried out in a process phase which is as stable as possible. Typically the average absolute thickness of the web even stays within the range of variation of ±0.5 microns.

According to an embodiment the calibration of the measuring equipment 1 is carried out at one location in the width direction of the web. In that case the changes taking place in the machine direction of the paper web can be averaged in such a way that the measurement produces a reliable calibration. At this stage the absolute thickness of the paper is not known per se, but the first sensor 10 and the second sensor 11 can be linearized with respect to each other.

According to another embodiment the measuring equipment can also be calibrated when it is moved back and forth in the width direction of the paper web 2, i.e. traversed, at the same time as the paper web moves forward. When the movement of the reference piece 12 and the web supported thereto with respect to the sensors 10 and 11 and the frequency of the movements, i.e. the times when the reference piece 12 has been moved, are known, this measurement data may be used for calibrating the sensors 10 and 11 with respect to each other as described above.

Figure 4:
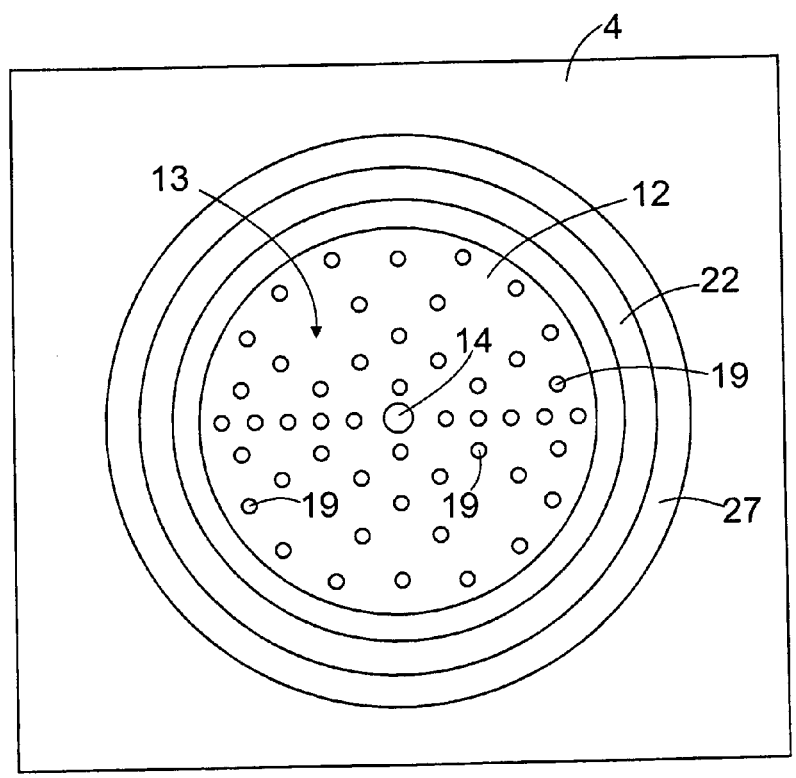
FIG. 4 is a schematic top view of a part of measuring equipment of FIG. 3.

FIG. 3 is a schematic sectional side view of a possible embodiment of the second measuring head 4 used in the measuring equipment 1. FIG. 4 is a top view of the second measuring head 4 of FIG. 3. In the embodiment of the second measuring head 4 shown in FIGS. 3 and 4 the reference piece 12 is provided with a plural number of holes 19 arranged around the measurement point 14, at different distances from the measurement point 14, and extending through the reference piece 12. In other words, in the direction of travel of the web 2 these holes 19 are before and after the measurement point 14 and at the side of the measurement point 14. The measurement point 14 forms the area where the distance between the first sensor 10 and the moving paper web 2 is measured by means of the laser mentioned above, for example. The reference piece 12 in turn is placed to the other measuring head 4 in such a way that a substantially open air space 20 is left below the reference piece 12. Further, the second measuring head 4 is provided with a feed conduit 21 and a nozzle gap 22 for feeding a gaseous medium between the second measuring head 4 and the paper web 2 and means, such as a blower 23 and a blower control unit 24 for controlling it, for feeding the gas into the feed conduit 21. For the sake of clarity, FIG. 1 does not show the valves used in the feeding of the gas. The feeding of the gas is depicted with arrows C. The gas to be fed is preferably air, although some other gas may be used as well.

The gas to be fed into the feed conduit 21 flows from the feed conduit 21 into the nozzle gap 22. In the embodiment of FIGS. 3 and 4 the feed conduit 21 is annular and so is the nozzle gap 22. The nozzle gap 22 is surrounded by a curved guide surface 25, the nozzle gap 22 and the curved guide surface 25 thus forming a kind of a Coanda nozzle. From the nozzle gap 22 the gas is discharged towards the paper web 2, the curved guide surface 25 in the immediate vicinity of the nozzle gap 22 diverting the gas so that it flows between the paper web 2 and the second measuring head 4. The gas thus flows as depicted by arrows C. The pressure of the gas and thereby its flow rate are adjusted to such a magnitude that the gas flowing between the paper web 2 and the second measuring head 4 creates a negative pressure. Due to the impact of the Coanda nozzle the negative pressure thus created acts on the air space 20 below the reference piece 12 and further through the holes 19 made into the reference piece 12 between the reference piece and the paper web 2 at the reference piece 12, the impact of this negative pressure thus causing the paper web 2 to become supported against the upper surface of the reference piece 12, i.e. against the reference surface 13. The curved guide surface 25 may be formed to a frame structure 26 of the second measuring head 4 surrounding the nozzle gap 22 or to a profile element 27 to be arranged around the nozzle gap 22, as shown in FIGS. 3 and 4. Naturally the negative pressure can also be generated using a vacuum pump.

The holes 19 formed through the reference piece 12 are positioned in the reference piece 12 in such a way that the moving paper web 2 sets straight and flat against the measurement point 14 in the reference piece 12. The holes 19 are dimensioned to be large enough for letting through dust and other impurities carried by the paper web 2, yet small enough so that the paper web 2 supported against the reference piece 12 cannot become blistered or wrinkled but sets evenly against the reference piece 12 and particularly against the measurement point 14.

The negative pressure formed below the reference piece 12 may be used for enhancing the supporting of the moving paper web 2 against the reference piece 12 in such a way that vibrations possibly created at high web 2 speeds cannot detach the web 2 from the reference piece 12 at the measurement point 14. The web does not get blistered or wrinkled in any other way either but stays at the area of the measurement point 14, supported against the reference piece 12, thus allowing the calibration to be carried out even with the web 2 proceeding at a considerably high speed, because the web 2 cannot become detached from the reference piece 12 at the area of the measurement point 14.

The feed pressure of the gas to be fed between the moving paper web 2 and the second measuring head 4 and thereby its flow rate may vary depending on the speed, tightness, grade or grammage of the paper web 2, for example. The flow rate of the gas may be changed for example by means of the blower 23 controlled by the blower control unit 24. The pressure difference that has to be created between the paper web 2 and the air space 20 for supporting the paper web 2 against the reference piece 2 is very small. Even an air space 20 pressure that is about one percent lower than the pressure between the reference piece 12 and the paper web 2 is enough for supporting the web 2 to the reference piece 12 so that vibration or blistering is not formed in the web 2 at the measurement point 14. FIG. 3 further shows schematically support members 28 allowing the reference piece 12 to be supported to the second measuring head 4 during a normal measuring operation in such a way that the reference piece 12 does not necessarily rest at all or solely on the shaft 17.

In some cases the features disclosed in this application may be used as such, irrespective of the other features. On the other hand, the features disclosed in this application may be combined, when necessary, to provide different combinations.

The drawings and the related specification are only intended to illustrate the idea of the invention. The details of the invention may vary within the claims. The examples of the Figures relate to semi-contacting measuring equipment, in which the moving web is supported for the duration of the measurement. Naturally the disclosed calibration carried out in relation to a moving web that is being manufactured can also be applied in non-contacting measuring equipment, in which the web is not separately supported at the measurement location of the sensors during a normal measurement operation. In that case the reference piece 12 belonging to the measuring equipment is naturally used for supporting the paper web 2 during the calibration only, whereas after the calibration the reference piece 12 is lowered in such a way that the web no longer rests on the reference piece 12 during normal measurement. At the same time it is naturally also possible to discontinue the generating of the negative pressure between the moving web 2 and the reference piece. In that case in non-contacting measuring equipment having sensors on both sides of the moving web the means for moving the reference piece 12 and the moving web in relation to the sensors must be arranged in such a way that a sensor 29 can be arranged below the reference piece 12 to measure the distance between the sensor in question and the lower surface of the moving web. In that case it is of course possible to arrange at least one opening at the measurement point for carrying out the measurement by the sensor, such as an optical sensor or a laser sensor. If desired, semi-contacting measuring equipment may also be provided with a corresponding structure if the distance of the web from the reference surface 13 of the reference piece 12 is to be measured for some reason. Further, the web 2 may be supported against the reference piece 12 also without the negative pressure for example by pressing the reference piece 12 against the web 2, whereby the tightness of the web 2 produces a sufficiently even contact between the web 2 and the reference piece 12. Further, the web 2 may be supported against the reference piece 12 for example by means of mechanical forcing or air guidance.

The invention claimed is:

1. A method for calibrating measuring equipment measuring a thickness of a moving web, the measuring equipment comprising at least one first sensor, at least one second sensor and at least one reference piece, the method comprising:
   supporting the moving web to the reference piece;
   moving the reference piece and the moving web supported thereto to different distances from the first sensor and the second sensor;
   measuring a distance between the moving web and the first sensor by means of the first sensor for at least two different distances;
   measuring a distance between the reference piece and the second sensor by means of the second sensor for at least two different distances; and
   calibrating the first sensor and the second sensor to be uniform with respect to the movement of the reference piece.

2. A method according to claim 1, wherein a negative pressure between the moving web and the reference piece is created for supporting the moving web to the reference piece.

3. A method according to claim 1, wherein the reference piece is provided with a measurement point, the first sensor is configured to measure a first distance between the moving web and the first sensor from within an area indicated by the measurement point and the reference piece is arranged to the measuring equipment in such a way that below the reference piece there is a substantially open air space, the measuring equipment further comprising:
   means for creating a negative pressure in the air space below the reference piece;
   the reference piece being provided with holes piercing the reference piece at different distances from the measurement point; and in the air space, a negative pressure that acts through the holes in the reference piece between the reference piece and the moving web is created in such a way that the moving web is supported against the reference piece substantially at least on an entire area of the measurement point.

4. A method according to claim 3, wherein the measuring equipment comprises:
   a first measuring head and a second measuring head to be placed on opposite sides of the moving web in the direction of thickness of the web;
   the first sensor and the second sensor are arranged to the first measuring head;
   the reference piece is arranged to the second measuring head, the second measuring head is provided with at least one conduit connected to the air space below the reference piece; and a gaseous medium is fed between the second measuring head and the moving web in such a way that the feeding of the gaseous medium causes a negative pressure in the air space and further through the holes of the reference piece between the reference piece and the moving web.

5. A method according to claim 4, wherein the conduit for feeding the gaseous medium between the second measuring head and the moving web comprises a nozzle gap between the reference piece and a frame structure of the second measuring head or a profile element arranged to the frame structure, and the gaseous medium is fed from the nozzle gap between the second measuring head and the moving web along edges of the frame structure of the second measuring head or those of the profile element arranged to the frame structure.

6. A method according to claim 5, wherein the frame structure of the second measuring head or the profile element arranged thereto includes a curved guide surface for diverting the gaseous medium to flow between the second measuring head and the moving web.

7. A method according to claim 4, wherein the gaseous medium is air.

8. A method according to claim 1, wherein the measuring equipment further includes at least one third sensor, and
   the distance of the moving web and the third sensor is measured in the direction of thickness of the web from an opposite side thereof in relation to the first sensor; and
   the first sensor, the second sensor and the third sensor are calibrated to be uniform in relation to the movement of the reference piece.

9. A method according to claim 1, wherein the distance between the first sensor and the moving web is measured optically.

10. A method according to claim 1, wherein the distance between the second sensor and the reference piece is measured inductively, capacitively, or by some other means in which the measurement is taken through the moving web.

11. A method according to claim 8, wherein the distance between the third sensor and the moving web is measured optically.

12. A method according to claim 1, wherein the measuring equipment further comprises an actuator and a shaft arranged between the actuator and the reference piece and the reference piece is moved in relation to the sensors with the shaft by using the actuator.

13. A method according to claim 1, wherein the moving web is a paper web, a board web, a tissue web or a pulp web.

14. Measuring equipment for measuring a thickness of a moving web, the measuring equipment comprising:
   at least one first sensor;
   at least one second sensor; and
   at least one reference piece, wherein the reference piece is arranged to support the moving web;

the reference piece is arranged to be moved to different distances from the first sensor and the second sensor;

the first sensor is arranged to measure a distance between the moving web and the first sensor for at least two different distances;

the second sensor is arranged to measure a distance between the reference piece and the second sensor for at least two different distances; and the measuring equipment further includes a data processing unit configured to calibrate the first sensor and the second sensor to be uniform in relation to the movement of the reference piece and in relation to the thickness of the moving web.

15. Measuring equipment according to claim 14, further comprising:

an actuator and a shaft arranged between the actuator and the reference piece for moving the reference piece with the shaft by using the actuator.

16. Measuring equipment according to claim 15, wherein the actuator is a step motor.

17. Measuring equipment according to claim 14, further comprising:

means for creating a negative pressure between the moving web and the reference piece for bringing the moving web into contact with the reference piece.

18. Measuring equipment according to claim 14, wherein the reference piece is provided with a measurement point, the first sensor is arranged to measure the distance between the moving web and the first sensor from within the area indicated by the measurement point, the reference piece is arranged to the measuring equipment in such a way that below the reference piece there is a substantially open air space, and the measuring equipment further comprises means for creating a negative pressure in the air space below the reference piece and the reference piece is provided with holes piercing the reference piece at different distances from the measurement point such that the negative pressure to be created in the air space is arranged to act between the reference piece and the moving web through the holes made to the reference piece in such a way that the moving web is supported to the reference piece substantially at least on the entire area of the measurement point.

19. Measuring equipment according to claim 18, further comprising:

a first measuring head and a second measuring head to be placed on opposite sides of the moving web in the direction of thickness of the web;

the first sensor and the second sensor are arranged to the first measuring head.

the reference piece is arranged to the second measuring head; and the second measuring head is provided with at least one conduit connected to the air space below the reference piece, the conduit being configured to feed a gaseous medium between the second measuring head and the moving web in such a way that the feeding of the gaseous medium is arranged to create a negative pressure in the air space and, further, between the reference piece and the moving web through the holes in the reference piece.

20. Measuring equipment according to claim 19, wherein the conduit for feeding the gaseous medium between the second measuring head and the moving web comprises a nozzle gap arranged between the reference piece and a frame structure of the second measuring head or a profile element arranged to the frame structure, the gaseous medium being arranged to be fed from the nozzle gap between the second measuring end and the moving web along edges of the frame structure of the second measuring head or those of the profile element arranged to the frame structure.

21. Measuring equipment according to claim 20, wherein the frame structure of the second measuring head or the profile element arranged thereto includes a curved guide surface for diverting the gaseous medium to flow between the second measuring head and the moving web.

22. Measuring equipment according to claim 19, wherein the gaseous medium is air.

23. Measuring equipment according to claim 14, further comprising:

at least one third sensor configured to measure the distance of the moving web and the third sensor in the thickness direction of the web on an opposite side thereof in relation to the first sensor; and the data processing unit is configured to calibrate the first sensor, the second sensor and the third sensor to be uniform in relation to the movement of the reference piece.

24. Measuring equipment according to claim 14, wherein the first sensor comprises a laser arranged to measure optically the distance between the first sensor and the moving web.

25. Measuring equipment according to claim 14, wherein the second sensor comprises a coil arranged to measure inductively the distance between the second sensor and the reference piece.

26. Measuring equipment according to claim 23, wherein the third sensor comprises a laser arranged to measure optically the distance between the third sensor and the moving web.

27. Measuring equipment according to claim 14, wherein the moving web is a paper web, a board web, a tissue web or a pulp web.

* * * * *